United States Patent
Müller et al.

(10) Patent No.: US 7,228,960 B2
(45) Date of Patent: Jun. 12, 2007

(54) HOT MATERIAL CONVEYOR

(75) Inventors: Lutz Müller, Mülheim (DE); Burkhard Poppeck, Duisberg (DE)

(73) Assignee: Aumund-Fördererbau GmbH & Co. KG (DE)

( * ) Notice: Subject to any disclaimer, the term of this patent is extended or adjusted under 35 U.S.C. 154(b) by 73 days.

(21) Appl. No.: 10/546,350

(22) PCT Filed: Feb. 19, 2004

(86) PCT No.: PCT/EP2004/001601

§ 371 (c)(1),
(2), (4) Date: Sep. 28, 2005

(87) PCT Pub. No.: WO2004/074521

PCT Pub. Date: Sep. 2, 2004

(65) Prior Publication Data

US 2006/0153726 A1 Jul. 13, 2006

(30) Foreign Application Priority Data

Feb. 19, 2003 (DE) ............... 203 02 678 U

(51) Int. Cl.
*B65G 21/08* (2006.01)

(52) U.S. Cl. .............. 198/860.3; 198/952; 419/25

(58) Field of Classification Search ............ 198/735.3, 198/860.3, 860.5, 952; 419/25; 148/660, 148/664; 75/430
See application file for complete search history.

(56) References Cited

U.S. PATENT DOCUMENTS

| 2,637,671 | A | * | 5/1953 | Pavitt ..................... 419/25 |
| 4,002,472 | A | * | 1/1977 | LeBrasse et al. ............ 419/25 |
| 5,930,579 | A | | 7/1999 | Nagumo et al. |
| 6,176,368 | B1 | * | 1/2001 | Bradbury et al. ........ 198/860.5 |
| 6,652,620 | B2 | * | 11/2003 | Miyagawa et al. .......... 75/430 |
| 2003/0019548 | A1 | | 1/2003 | Miyagawa et al. |

FOREIGN PATENT DOCUMENTS

WO    WO 96/23081    8/1996

* cited by examiner

*Primary Examiner*—James R. Bidwell
(74) *Attorney, Agent, or Firm*—Robert W Becker & Associates; Robert W Becker

(57) ABSTRACT

A conveyor for hot material comprising a conveying unit for conveying the hot material, a material delivery unit for delivering the hot material to the conveying unit, a housing for covering at least a portion of the length of the conveying unit, introduction devices disposed in the housing for furnishing water to the hot material on the conveying unit, wherein the introduction devices are disposed exclusively in a section of the housing that in the conveying direction is remote from the material delivery unit, and an exhaust unit connected to the material delivery unit for withdrawal of water vapor, generated by the furnishing of water, to produce a water vapor stream that is counter to the conveying direction of the hot material and is directed toward the material delivery unit.

6 Claims, 2 Drawing Sheets

HOT MATERIAL CONVEYOR

This specification for the instant application should be granted the priority date of Feb. 19, 2003, the filing date of the corresponding German patent application 203 02 678.0 as well as the priority date of Feb. 19, 2004, the filing date of the corresponding International patent application PCT/EP2004/001601.

BACKGROUND OF THE INVENTION

The invention relates to a conveyor for hot material comprising a conveying means that is covered over at least a portion of its length by a housing, and that is connected to a material delivery means, whereby provided in the housing that covers the conveying means are introduction devices for applying water to the hot material that is disposed on the conveying means.

A hot material conveyor having the aforementioned features is described in U.S. Pat. No. 5,930,579. To the extent that such a hot material conveyor is used for the conveying and simultaneous cooling of directly reduced iron, especially in the form of pellets produced in a press, suitable measures prevent the hot material, i.e. the hot pellets, from coming into contact with air or oxygen, so that oxidation is prevented during the conveying and cooling process. For this purpose, U.S. Pat. No. 5,930,579 proposes to supply water to the hot material over the entire length of the housed conveyor via suitable introduction devices, so that on the one hand the hot material is cooled off, yet at the same time evaporation of the applied water produces water vapor that in the housing that covers the conveying means forms an inert atmosphere for the hot material, so that an entry of air, and hence of oxygen, is avoided.

The known hot material conveyor has the drawback that the supply of water to the hot material is effected over the entire length of the conveying means, therefore also in the immediate vicinity of the material delivery means, in other words at a location at which the hot material has its highest temperature. Due to the thereby occurring, shock-like cooling of the hot material via the water that is applied immediately following the material delivery means, a mechanical stressing of the hot material results that can lead to impairment of the integrity of the individual constituents of the hot material, in particular of the pellets that are produced, which is a drawback with regard to the further processing of the material.

It is therefore an object of the invention to provide a hot material conveyor of the aforementioned type that ensures a careful treatment of the hot material.

SUMMARY OF THE INVENTION

The basic concept of the invention is that the introduction means are disposed exclusively in a section of the conveying means that, in the conveying direction, is remote from the material delivery means, and an exhaust means is connected to the material delivery means for the withdrawal of the water vapor that is generated by the furnishing of water.

Inasmuch as the supply of water, or also moistened air as a carrier of very finely divided water, to the hot material is effected only at a distance from the material delivery means, the water vapor that is initially produced at a distance from the material delivery means flows counter to the direction of conveying of the hot material upon the conveyor and thereby ensures a careful initial cooling of the hot material; this intentional water vapor stream is brought about by the exhaust means that is connected to the material delivery means or in any case to a region of the conveyor or the housing that directly adjoins the material delivery means. Since the initial cooling speed following the material delivery means is lower due to the poor heat exchange in view of the convective heat transfer in the region of the water vapor stream relative to the evaporative cooling in the region of the immediate water supply, greater temperature differences within the individual material particles or pellets are avoided, so that the material particles or pellets are prevented from breaking off or breaking apart.

Pursuant to one embodiment of the invention, the introduction means are embodied as spray nozzles disposed in the housing for direct sprayed-in water. Alternatively, the introduction means can be embodied as short feed pipes disposed in the housing for the introduction of a water/air mixture.

If pursuant to an embodiment of the invention the material delivery means is integrated into the housing of the hot material conveyor, the entry of air or oxygen is also reliably prevented in this region.

Pursuant to one embodiment of the invention, the exhaust means comprises a blower that is connected via an exhaust line to the material delivery means, whereby a dust collector can be disposed upstream of the blower in order to increase the operational reliability of the blower.

BRIEF DESCRIPTION OF THE DRAWINGS

Shown in the drawing are embodiments of the invention, which will be described subsequently. The drawing shows.

DESCRIPTION OF SPECIFIC EMBODIMENTS

Figure 1:
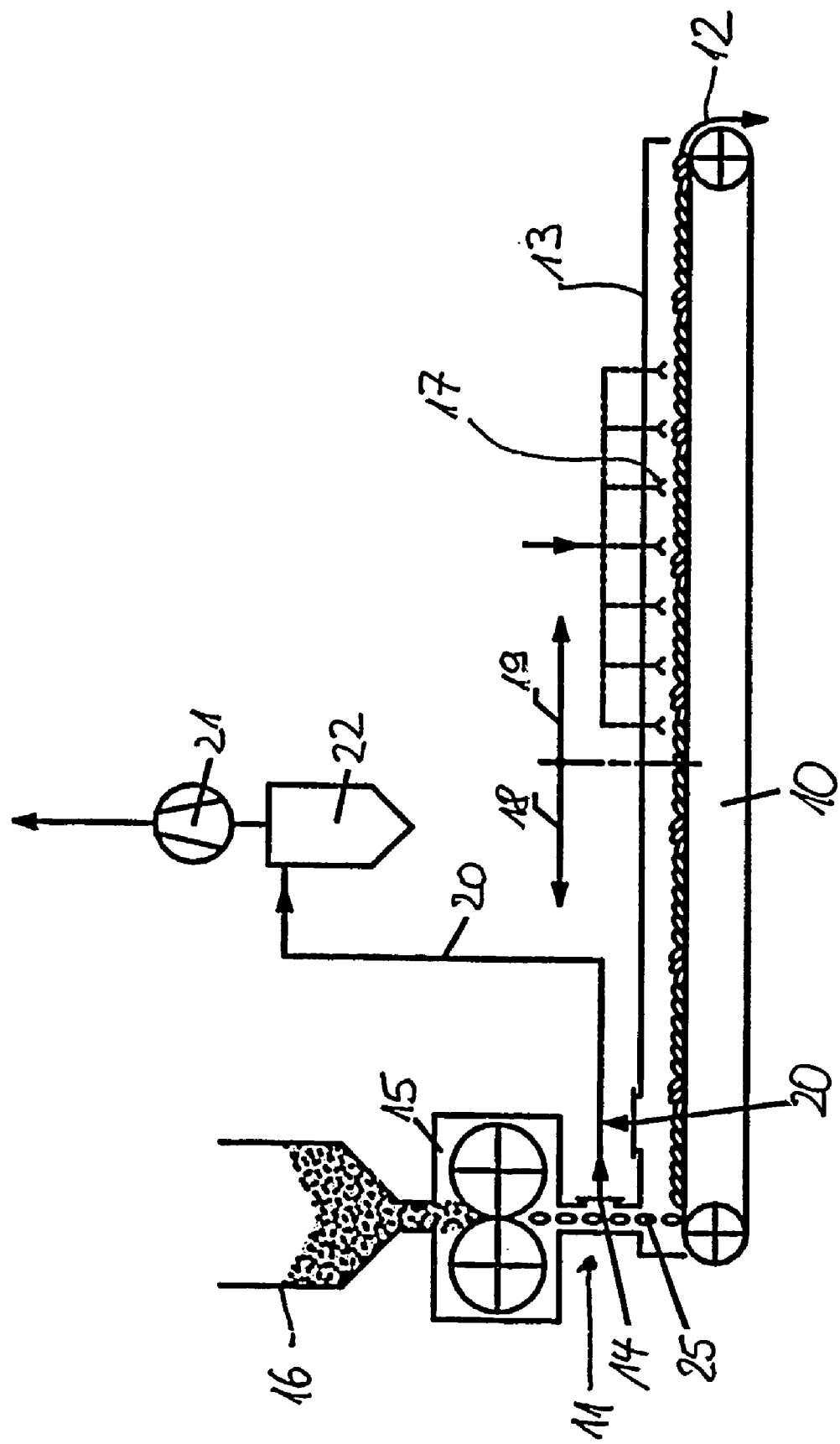
FIG. 1 a schematic illustration of a conveyor for hot material having hot material feed and material cooling.

As can be seen from FIG. 1, a conveying means 10 is provided, with the front end of which is associated a material delivery means 11, while a material discharge means 12 is provided at the rear end thereof. The conveying means 10 is covered over its entire length by a housing 13, whereby the material delivery means 11 is integrated into the housing by an inlet housing 14 that is connected to the housing 13. The inlet housing 14 directly adjoins a press or extruder 15, ahead of which is disposed a supply hopper 16 for the material that is to be conveyed, or the hot material. Pellets 25 are pressed in the press 15, for example from directly reduced iron, and the pellets are carried away via the conveying means 10 that is disposed at the outlet end.

Provided in a section 19 of the housing 13 that is remote from the material delivery means 11 are spray nozzles 17 for spraying water, so that in the rear region 19 an evaporative cooling is provided by the sprayed-on water. To the extent that water vapor results in this section 19, this water vapor flows in a direction toward the material delivery means 11 via the portion 18 of the conveying means 10 that is disposed upstream of the section 19, whereby this water vapor stream is produced in that connected to the inlet housing 14 of the material delivery means 11 is an exhaust or withdrawal line 20 in which is disposed a blower 21 for producing the required exhaust vacuum. A dust separator or collector 22 is disposed between the inlet housing 14 and the blower 21.

Figure 2:
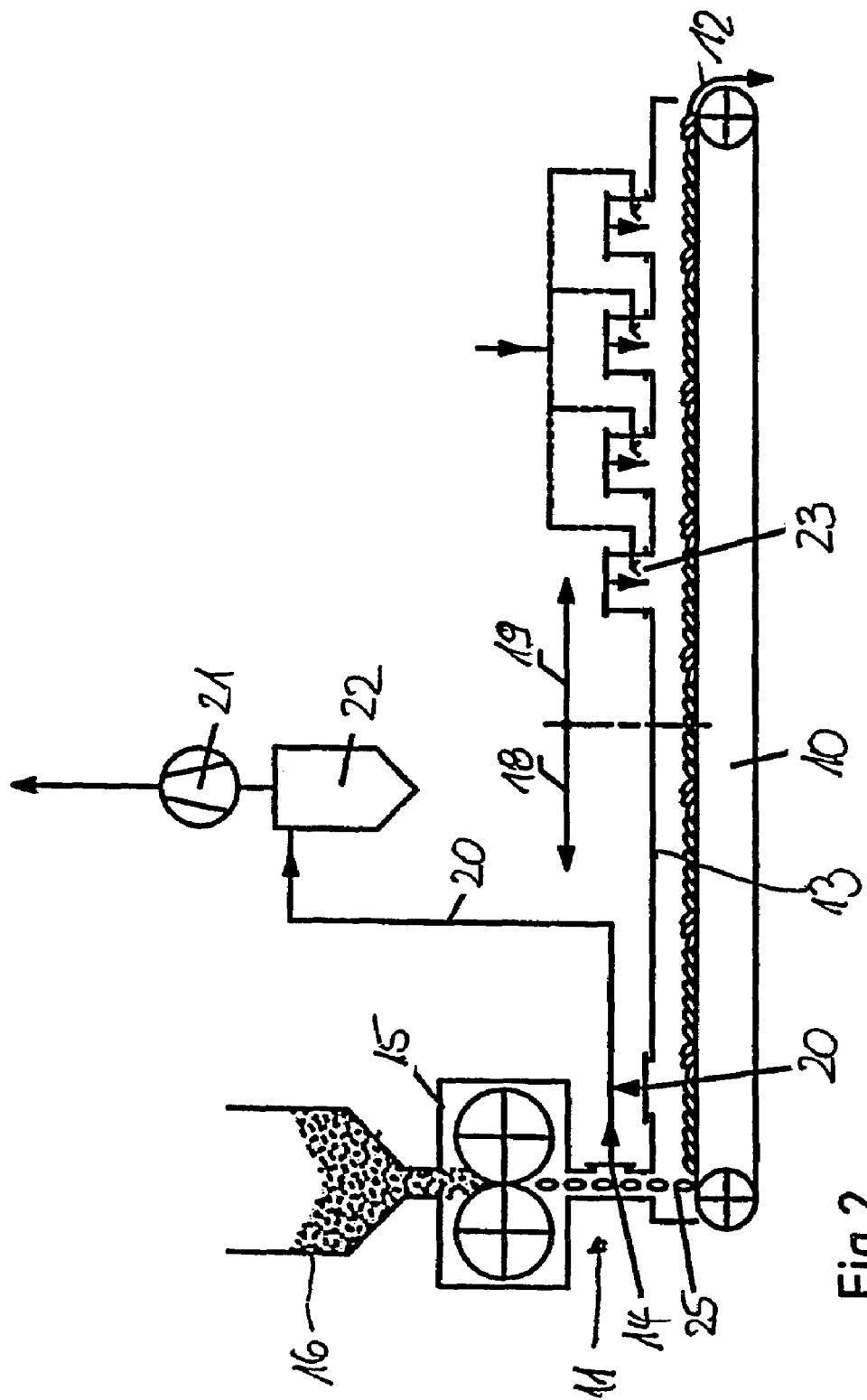
FIG. 2 shows another embodiment of the subject matter of FIG. 1.

The embodiment illustrated in FIG. 2 differs from the previously described embodiment only in that instead of the spray nozzles 17, nozzles or short feed pipes 23 are provided in the housing 13 to which are connected conduits via which a water/air mixture is introduced into the housing 13. The water constituents contained in the mixture come into contact with the hot material in the same manner as described in conjunction with FIG. 1, so that also with this embodiment water vapor is accordingly generated that produces the desired inert atmosphere in the housing 13.

The features of the subject matter disclosed in the preceding description, the patent claims and the drawing can be important individually as well as in any desired combination with one another for realizing the various embodiments of the invention.

The specification incorporates by reference the disclosure of German priority document 203 02 678.0 filed Feb. 19, 2003 and PCT/EP2004/001601 filed Feb. 19, 2004.

The present invention is, of course, in no way restricted to the specific disclosure of the specification and drawings, but also encompasses any modifications within the scope of the appended claims.

The invention claimed is:

1. A conveyor for hot material, comprising:
   a conveying means for conveying said hot material;
   a material delivery means for delivering said hot material to said conveying means;
   a housing for covering at least a portion of a length of said conveying means;
   introduction means disposed in said housing for furnishing water to said hot material disposed on said conveying means, wherein said introduction means are disposed exclusively in a section of said housing that, in a direction of conveying of said hot material on said conveying means, is remote from said material delivery means; and
   an exhaust means connected to said material delivery means for withdrawal of water vapor, generated by the furnishing of said water, to produce a water vapor stream that is counter to said direction of conveying of said hot material, and is directed toward said material delivery means.

2. A conveyor for hot material according to claim 1, wherein said introduction means are in the form of spray nozzles disposed in said housing.

3. A conveyor for hot material according to claim 1, wherein said introduction means are in the form of short feed pipes disposed in said housing for introducing a water/air mixture.

4. A conveyor for hot material according to claim 1, wherein said material delivery means is integrated into said housing.

5. A conveyor for hot material according to claim 1, wherein said exhaust means comprises a blower that is connected to said material delivery means via an exhaust line.

6. A conveyor for hot material according to claim 5, wherein a dust collector is disposed upstream of said blower.

* * * * *

UNITED STATES PATENT AND TRADEMARK OFFICE
CERTIFICATE OF CORRECTION

| | |
|---|---|
| PATENT NO. | : 7,228,960 B2 |
| APPLICATION NO. | : 10/546350 |
| DATED | : June 12, 2007 |
| INVENTOR(S) | : Müller et al. |

It is certified that error appears in the above-identified patent and that said Letters Patent is hereby corrected as shown below:

<u>Title page,</u>
Item [54] and col. 1, line 1 and Item [86] should read as follows:

[54] Title: CONVEYOR FOR HOT MATERIAL

[86] PCT No.:     PCT/EP2004/001601

§ 371 (c)(1),
　　　(2), (4) Date: August 18, 2005

Signed and Sealed this

Seventh Day of August, 2007

JON W. DUDAS
*Director of the United States Patent and Trademark Office*